United States Patent [19]

van Beveren et al.

[11] 4,109,856
[45] Aug. 29, 1978

[54] METHOD FOR TRANSMITTING BINARY SIGNALS

[75] Inventors: Marius van Beveren, Leidschendam; Peerke Jan Nuhoff, Alphen aan de Rijn, both of Netherlands

[73] Assignee: De Staat der Nederlanden, Te Dezen Vertegenwoordigd Door de Directeur-Generaal der Posterijen, Telegrafie en Telefonie, The Hague, Netherlands

[21] Appl. No.: 684,565

[22] Filed: May 10, 1976

[30] Foreign Application Priority Data

May 14, 1975 [NL] Netherlands ............... 7505680

[51] Int. Cl.² ............................................. G06F 11/00
[52] U.S. Cl. ........................................ 235/308; 178/22
[58] Field of Search ............... 178/22; 235/153 AP, 235/92 SH, 308; 307/221 R; 328/37, 48, 120

[56] References Cited

U.S. PATENT DOCUMENTS

| | | | |
|---|---|---|---|
| 3,051,855 | 8/1962 | Lee | 328/48 |
| 3,109,990 | 10/1963 | Shuba | 328/48 |
| 3,470,364 | 9/1969 | Fullton | 235/153 AP |
| 3,530,284 | 9/1970 | Wood | 328/48 |
| 3,555,249 | 6/1971 | Ahrons | 328/48 |
| 3,691,472 | 9/1972 | Bohman | 328/48 |
| 3,732,407 | 5/1973 | Brewster et al. | 235/153 AP |
| 3,868,631 | 2/1975 | Morgan et al. | 178/22 |
| 3,876,832 | 4/1975 | Morgan et al. | 178/22 |

OTHER PUBLICATIONS

IBM Technical Disclosure Bulletin, vol. 15, No. 6 (11/72), pp. 1848–1849.
IBM Technical Disclosure Bulletin, vol. 14, No. 7 (12/71), p. 2127.

*Primary Examiner*—Samuel W. Engle
*Assistant Examiner*—S. A. Cangialosi
*Attorney, Agent, or Firm*—Hugh Adam Kirk

[57] ABSTRACT

Method and device for transmitting binary signals by means of digital self-synchronising scramblers, the information of the storage elements used being utilized, in combination with that of the input signal, for detecting the degenerative condition of a long series of identical bits.

If the said condition is still existing after a number of consecutive clock periods, a change is made in it by inverting one bit of the input signal.

The detection and the inversion also take place at the receiving end, thus ensuring an unerring working of the system.

10 Claims, 4 Drawing Figures

TRANSMITTER

PRIOR ART SCRAMBLER AT TRANSMITTER

PRIOR ART DESCRAMBLER AT RECEIVER

TRANSMITTER

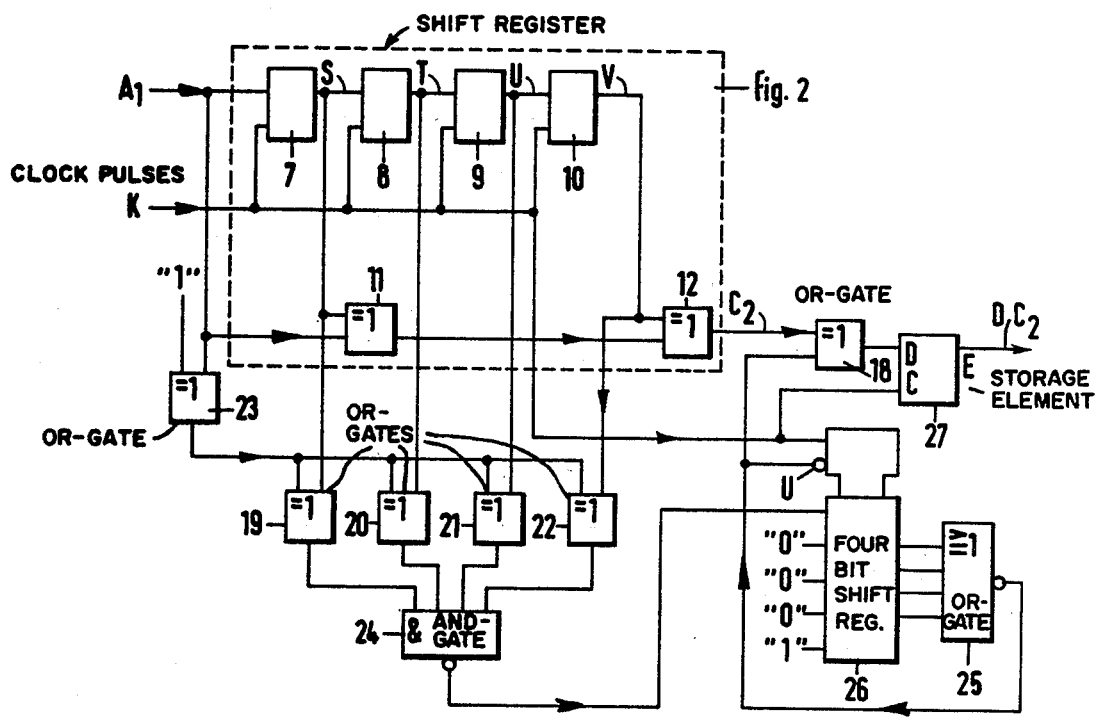

METHOD FOR TRANSMITTING BINARY SIGNALS

BACKGROUND OF THE INVENTION

The invention relates to a method for transmitting binary signals by means of digital self-synchronising so-called scramblers.

Scramblers of this type are known from J.E. Savage: "Some Simple Self-Synchronising Digital Data Scramblers", The Bell System Technical Journal 46 (February 1967) pp. 449–487. The scramblers are utilized in order to avoid long series of zeros or ones on the transmission path, in consequence of which a better clock extraction can be obtained, the chances of crosstalk and irregularities are reduced, and a considerable amount of secrecy can be achieved. Depending upon the input signal the known selfsynchronising scramblers may degenerate in certain states, id est, they stop continuing their function by transmitting an uninterrupted series of zeros ("0") or ones ("1") on the transmission path.

SUMMARY OF THE INVENTION

The invention provides a solution for the said problem by utilizing the information of the storage elements used and that of the input signal for detecting the so-called degenerative condition. If the said condition is maintained during a fixed number of consecutive clock periods, one bit of the input signal is inverted by means of logic circuits in consequence of which the degenerative condition comes to an end when the input signal remains otherwise unchanged.

The utilization of the method according to the invention yields excellent results, and it does not present serious difficulties even though there is a chance that the input signal changes at the very moment when a bit of the input signal is being inverted. With the aforesaid method there is an erroneous bit at the receiving end when descrambling has taken place, which bit is caused by the inversion at the transmitting end. The invention offers a solution in this case because of the fact that the degenerative condition detected at the transmitting end is also detected at the receiving end. Thus when the said condition is maintained during the said fixed number of consecutive clock periods, one bit of the output signal is similarly inverted by means of logic circuits, in consequence of which the original information is restored.

The invention also relates to a device for carrying out the method, which device comprises at the transmitting end a feedback shift register for producing a maximum length series. The storage elements of the shift register are connected to an OR-gate in such a way that by means of a second shift register connected to the output of this OR-gate, and after the abovementioned fixed number of clock periods, a degenerative condition can be detected with the help of another OR-gate connected to the second shift register. This other OR gate is connected on the one output side to an exclusive OR-gate at the input of the first mentioned shift register, and on the other output side to the parallel read input of the second shift register, which has such a read condition that only one bit of the input signal can be inverted.

At the receiving end the device comprises a shift register, the storage elements of which are each connected to an input of an exclusive OR-gate. These OR-gates on their other input sides are connected, via an exclusive OR-gate with one fixed input signal ("1") and to the input of the shift register. The outputs of these OR-gates are connected to an AND-gate with an ignored output and which is capable of delivering a signal when ascertaining a degenerative condition in an input signal. This delivered signal is capable of controlling a second shift register in such a way that, after the fixed number of clock periods, a pulse can be delivered, via an OR-gate with an ignored output. This ignored output is connected to an exclusive OR-gate in the output of the first shift register and on the other side to the parallel read input of the second shift register, which has such a read condition that only one bit of the output signal can be inverted.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 4 shows a schematic block wiring diagram of an associated device according to the invention at the receiving end for the signals transmitted by the device in FIG. 3.

DETAILED DESCRIPTION OF PREFERRED EMBODIMENTS

1. The Prior Art

Figure 1:
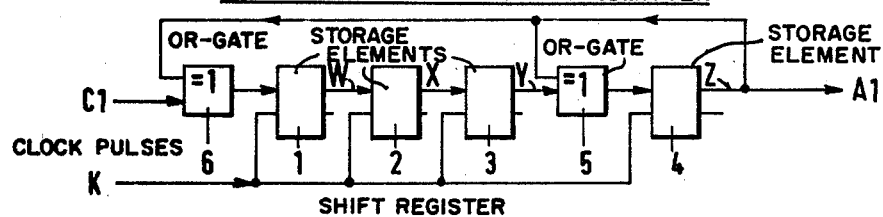
FIG. 1 shows a schematic block wiring diagram of prior art shift register scrambling device at the transmitting end, in which the invention is not utilized.

FIG. 1 shows a shift register with an input C1 and an output A1, which register is formed by four storage elements 1, 2, 3 and 4, of which the outputs are W, X, Y and Z, respectively. The outputs Z and Y are coupled modulo-2 in an exclusive OR-gate 5, the output of which is connected to an input of the element 4. The output Z is coupled modulo-2 to the input C1 in an exclusive OR-gate 6. Clock pulses are delivered by way of a conductor K.

Table 1 shows on the left of the left-hand part the 15 code words for the case of a "0" input signal and on the left of the right hand part the 15 code words for the case of a "1" input signal. The output signal A1 at the output of the device according to FIG. 1 forms the input signal of the device according to FIG. 2.

Figure 2:
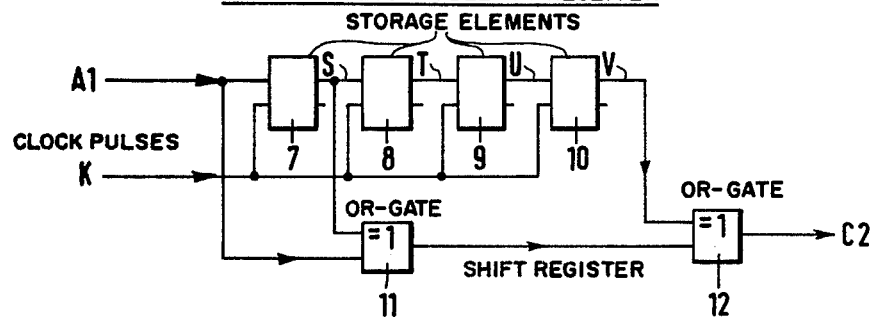
FIG. 2 is a schematic block wiring diagram of an associated prior art shift register descrambling device at the receiving end for the signals transmitted by the scrambling device in FIG. 1.

FIG. 2 shows a shift register with an input A1 and an output C2, which register is formed by four storage elements 7, 8, 9 and 10, of which the outputs are indicated by S, T, U and V, respectively. The input A1 and the output S are coupled modulo-2 by means of an exclusive OR-gate 11, the output of which is coupled modulo-2 to the output V by means of an exclusive OR-gate 12.

The output signal C2 of the device according to FIG. 2 has to correspond with the input signal C1 of FIG. 1 with a shift of four clock periods.

Table 1 shows on the right of the left-hand part the 15 code words for the case of an output signal $C2 = 0$ and on the right of the right-hand part the 15 code words for the case of an output signal $C2 = 1$.

Table 2 shows on the left that if at the transmitting end the input signal changes from "0" into "1" after the 12th code word, a degenerative condition will occur. Now the signal A1 changes permanently into "1" as long as C1 remains "1". From a mathematical point of view there is no error, but the object for which the circuit is utilized, viz. the interruption of long series of zeros or ones on the transmission path is now missed. Table 2 shows on the right that a degenerative condition will also occur if the signal C1 changes from "1" into "0" after the 11th code word.

2. Transmitter

Figure 3:
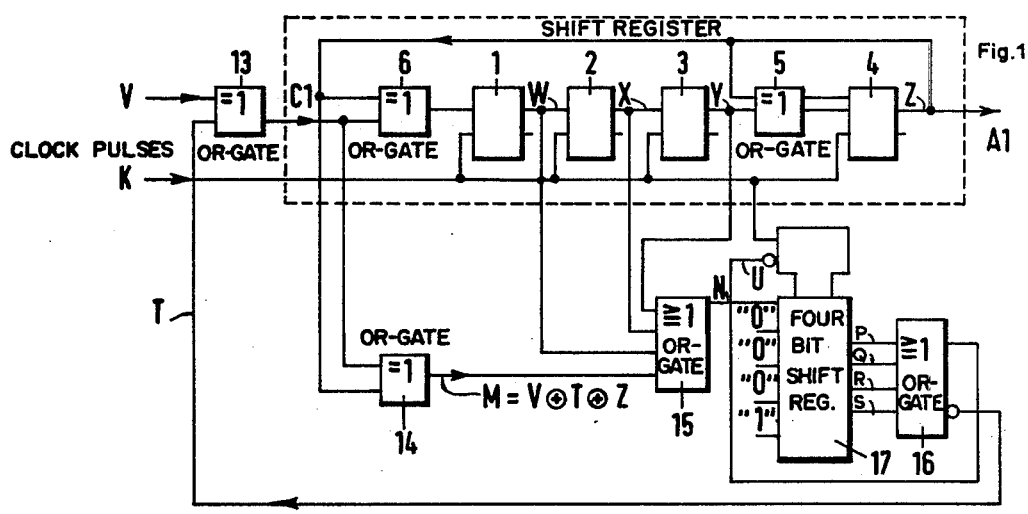
FIG. 3 is a schematic block wiring diagram of a device according to the invention at the transmitting end.

According to an object of this invention, the putting of an end to the degenerative condition, after the code word WXYZ = 0001 or WXYZ = 0000, occurs, during four consecutive clock periods (see top half of Table 2) is reached because the input signal C1 is inverted by means of an additional circuit in the next or fifth clock period. For this purpose the circuit at the transmitting end has been provided with: two exclusive OR-gates 13, 14, two OR-gates 15, 16, each having four inputs, and a 4-bit shift register 17 (see FIG. 3). These parts are connected as follows: The input signal V, as well as an ignored output of the OR gate 16 (via a connection T) are applied to the exclusive OR gate 13. The output of this OR-gate 13 is connected to an input of the OR gate 6. The two inputs of the OR gate 14 are connected in parallel to the two inputs of the OR-gate 6. The output of the OR-gate 14 is connected to an input of the OR-gate 15 by means of a connection M.

The outputs W, X and Y of the storage elements 1, 2 and 3 respectively are also connected to separate inputs of the OR-gate 15. By means of a connection N an output of OR gate 15 is connected to the shift register 17, of which four outputs are connected to four inputs of the OR gate 16.

This transmitter circuit works as follows. When the code word WXYZ = 0001 presents itself with a "1" as input signal V, T being = "0", then M = V ⊕ T ⊕ Z = 1 ⊕ 0 ⊕ 1 = 0. All four of the inputs of the OR-gate 15 are now "0", in consequence of which N = 0. At the next clock pulse the output P of the shift register 17 will become "0". If this condition occurs during four consecutive clock periods, then output T will become = 1, so that at the fifth clock period the input signal will be inverted, because of the fact that the signal T now becomes "1". If the input signal V is still (1,) the degenerative condition thereby comes to an end, which appears from Table 2.

If the code word WXYZ = 0000 presents itself with "0" as input signal at V, then output M = V ⊕ T ⊕ Z = 0. If this condition occurs during four consecutive clock periods, then outputs PQRS = 0000, after which outputs T becomes = "1" and the inversion of signal V will take place at the next clock period.

When outputs PQRS = 0000, the shift register 17 is put in the parallel read condition by means of an input U, in consequence of which outputs PQRS will become = 0001 at the next clock period and the inversion of the input 3. Receiver Table 2 shows that the output signal C2 of the descrambler is retarded 4 clock periods with respect to the input signal A1 of the descrambler. In Table 2 the possible retardation of the transmission path is left out of consideration, so that the output signal A1 of the scrambler coincides with the input signal A1 of the descrambler.

In the receiving circuit the code words STUV = 1111 and STUV = 0000 indicate the two degenerative conditions. When an input signal "1" or "0". One of

TABLE 1

| | C1 | W | X | Y | Z | A1 | S | T | U | V | C2 | | C1 | W | X | Y | Z | A1 | S | T | U | V | C2 |
|---|---|---|---|---|---|---|---|---|---|---|---|---|---|---|---|---|---|---|---|---|---|---|---|
| 1 | 0 | 1 | 1 | 1 | 1 | 1 | | | | | | 1 | 1 | 1 | 1 | 1 | 1 | 1 | | | | | |
| 2 | 0 | 1 | 1 | 1 | 0 | 0 | 1 | | | | | 2 | 1 | 0 | 1 | 1 | 0 | 0 | 1 | | | | |
| 3 | 0 | 0 | 1 | 1 | 1 | 1 | 0 | 1 | | | | 3 | 1 | 1 | 0 | 1 | 1 | 1 | 0 | 1 | | | |
| 4 | 0 | 1 | 0 | 1 | 0 | 0 | 1 | 0 | 1 | | | 4 | 1 | 0 | 1 | 0 | 0 | 0 | 1 | 0 | 1 | | |
| 5 | 0 | 0 | 1 | 0 | 1 | 1 | 0 | 1 | 0 | 1 | 0 | 5 | 1 | 1 | 0 | 1 | 0 | 0 | 0 | 1 | 0 | 1 | 1 |
| 6 | 0 | 1 | 0 | 1 | 1 | 1 | 1 | 0 | 1 | 0 | 0 | 6 | 1 | 1 | 1 | 0 | 1 | 1 | 0 | 0 | 1 | 0 | 1 |
| 7 | 0 | 1 | 1 | 0 | 0 | 0 | 1 | 1 | 0 | 1 | 0 | 7 | 1 | 0 | 1 | 1 | 1 | 1 | 1 | 0 | 0 | 1 | 1 |
| 8 | 0 | 0 | 1 | 1 | 0 | 0 | 0 | 1 | 1 | 0 | 0 | 8 | 1 | 0 | 0 | 1 | 0 | 0 | 1 | 1 | 0 | 0 | 1 |
| 9 | 0 | 0 | 0 | 1 | 1 | 1 | 0 | 0 | 1 | 1 | 0 | 9 | 1 | 1 | 0 | 0 | 1 | 1 | 0 | 1 | 1 | 0 | 1 |
| 10 | 0 | 1 | 0 | 0 | 0 | 0 | 1 | 0 | 0 | 1 | 0 | 10 | 1 | 0 | 1 | 0 | 1 | 1 | 1 | 0 | 1 | 1 | 1 |
| 11 | 0 | 0 | 1 | 0 | 0 | 0 | 0 | 1 | 0 | 0 | 0 | 11 | 1 | 0 | 0 | 1 | 1 | 1 | 1 | 1 | 0 | 1 | 1 |
| 12 | 0 | 0 | 0 | 1 | 0 | 0 | 0 | 0 | 1 | 0 | 0 | 12 | 1 | 0 | 0 | 0 | 0 | 0 | 1 | 1 | 1 | 0 | 1 |
| 13 | 0 | 0 | 0 | 0 | 1 | 1 | 0 | 0 | 0 | 1 | 0 | 13 | 1 | 1 | 0 | 0 | 0 | 0 | 0 | 1 | 1 | 1 | 1 |
| 14 | 0 | 1 | 0 | 0 | 1 | 1 | 1 | 0 | 0 | 0 | 0 | 14 | 1 | 1 | 1 | 0 | 0 | 0 | 0 | 0 | 1 | 1 | 1 |
| 15 | 0 | 1 | 1 | 0 | 1 | 1 | 1 | 1 | 0 | 0 | 0 | 15 | 1 | 1 | 1 | 1 | 0 | 0 | 0 | 0 | 0 | 1 | 1 |
| 1 | 0 | 1 | 1 | 1 | 1 | 1 | 1 | 1 | 1 | 0 | 0 | 1 | 1 | 1 | 1 | 1 | 1 | 1 | 0 | 0 | 0 | 0 | 1 |
| 2 | 0 | 1 | 1 | 1 | 0 | 0 | 1 | 1 | 1 | 1 | 0 | 2 | 1 | 0 | 1 | 1 | 1 | 1 | 0 | 0 | 0 | 0 | 1 |
| 3 | 0 | 0 | 1 | 1 | 1 | 1 | 0 | 1 | 1 | 1 | 0 | 3 | 1 | 1 | 0 | 1 | 1 | 1 | 0 | 1 | 0 | 0 | 1 |
| 4 | 0 | 1 | 0 | 1 | 0 | 0 | 1 | 0 | 1 | 1 | 0 | 4 | 1 | 0 | 1 | 0 | 0 | 0 | 1 | 0 | 1 | 0 | 1 |
| 5 | 0 | 0 | 1 | 0 | 1 | 1 | 0 | 1 | 0 | 1 | 0 | 5 | 1 | 1 | 0 | 1 | 0 | 0 | 0 | 1 | 0 | 1 | 1 |

TABLE 2

| | C1 | W | X | Y | Z | A1 | S | T | U | V | C2 | | C1 | W | X | Y | Z | A1 | S | T | U | V | C2 |
|---|---|---|---|---|---|---|---|---|---|---|---|---|---|---|---|---|---|---|---|---|---|---|---|
| 10 | 0 | 1 | 0 | 0 | 0 | 0 | 1 | 0 | 0 | 1 | 0 | 9 | 1 | 1 | 0 | 0 | 1 | 1 | 0 | 1 | 1 | 0 | 1 |
| 11 | 0 | 0 | 1 | 0 | 0 | 0 | 0 | 1 | 0 | 0 | 0 | 10 | 1 | 0 | 1 | 0 | 1 | 1 | 1 | 0 | 1 | 1 | 1 |
| 12 | 0 | 0 | 0 | 1 | 0 | 0 | 0 | 0 | 1 | 0 | 0 | 11 | 1 | 0 | 0 | 1 | 1 | 1 | 1 | 1 | 0 | 1 | 1 |
| 13 | 1 | 0 | 0 | 0 | 1 | 1 | 0 | 0 | 0 | 1 | 0 | 12 | 0 | 0 | 0 | 0 | 0 | 0 | 1 | 1 | 1 | 0 | 1 |
| 13 | 1 | 0 | 0 | 0 | 1 | 1 | 1 | 0 | 0 | 0 | 0 | 12 | 0 | 0 | 0 | 0 | 0 | 0 | 0 | 1 | 1 | 1 | 1 |
| 13 | 1 | 0 | 0 | 0 | 1 | 1 | 1 | 1 | 0 | 0 | 0 | 12 | 0 | 0 | 0 | 0 | 0 | 0 | 0 | 0 | 1 | 1 | 1 |
| 13 | 1 | 0 | 0 | 0 | 1 | 1 | 1 | 1 | 1 | 0 | 0 | 12 | 0 | 0 | 0 | 0 | 0 | 0 | 0 | 0 | 0· | 1 | 1 |
| 13 | 1→0 | 0 | 0 | 0 | 1 | 1 | 1 | 1 | 1 | 1 | 0 | 12 | 0→1 | 0 | 0 | 0 | 0 | 0 | 0 | 0 | 0 | 0 | 0 |
| 9 | 1 | 1 | 0 | 0 | 1 | 1 | 1 | 1 | 1 | 1 | 1 | 10 | 0 | 1 | 0 | 0 | 0 | 0 | 0 | 0 | 0 | 0 | 0 |
| 10 | 1 | 0 | 1 | 0 | 1 | 1 | 1 | 1 | 1 | 1 | 1 | 11 | 0 | 0 | 1 | 0 | 0 | 0 | 0 | 0 | 0 | 0 | 0 |
| 11 | 1 | 0 | 0 | 1 | 1 | 1 | 1 | 1 | 1 | 1 | 1 | 12 | 0 | 0 | 0 | 1 | 0 | 0 | 0 | 0 | 0 | 0 | 0 |
| 12 | 1 | 0 | 0 | 0 | 0 | 0 | 1 | 1 | 1 | 1 | 0→1 | 13 | 0 | 0 | 0 | 0 | 1 | 1 | 0 | 0 | 0 | 0 | 1→0 |
| 13 | 1 | 1 | 0 | 0 | 0 | 0 | 0 | 1 | 1 | 1 | 1 | 14 | 0 | 1 | 0 | 0 | 1 | 1 | 1 | 0 | 0 | 0 | 0 |
| 14 | 1 | 1 | 1 | 0 | 0 | 0 | 0 | 0 | 1 | 1 | 1 | 15 | 0 | 1 | 1 | 0 | 1 | 1 | 1 | 1 | 0 | 0 | 0 |
| 15 | 1 | 1 | 1 | 1 | 0 | 0 | 0 | 0 | 0 | 1 | 1 | 1 | 0 | 1 | 1 | 1 | 1 | 1 | 1 | 1 | 0 | 0 | 0 |
| 1 | 1 | 1 | 1 | 1 | 1 | 1 | 0 | 0 | 0 | 0 | 1 | 2 | 0 | 1 | 1 | 1 | 0 | 0 | 1 | 1 | 1 | 1 | 0 | these two degenerative conditions has presented itself during four consecutive clock periods, the inversion of the output signal C2 has to take place. For that purpose the circuit according to FIG. 2 has been provided with the following elements (FIG. 4): 6 exclusive OR-gates 18–23, an AND-gate 24 with an ignored output and four inputs, an OR-gate 25 with an ignored output, and four inputs and a 4-bit shift register 26. These elements are connected as follows: The inputs of the exclusive OR gates 19, 20, 21 and 22, respectively, are connected to the outputs STUV of the storage element 7, 8, 9 and 10. The other inputs of these gates are connected to the output of the exclusive OR-gate 23, of which one input is connected to the input A1, the other input being always "1".

As the output signal C2 of the exclusive OR-gate 12 can exhibit several transitions per bit period, it is sampled at the right moment by means of a storage element 27. Thus a constant output signal DC2, which is retarded one clock period with respect to C2, is obtained per bit period. The exclusive OR-gate 18 serves to effect the possible inversion of the output signal C2. One input of the OR-gate 18 is connected to the OR-gate 25 as well as to the input for the parallel read condition of the shift register 26. The four outputs of the shift register 26 are connected to the four inputs of the OR-gate 25. The ignored output of the AND gate 24, which is connected to the outputs of the OR-gates 19, 20, 21 and 22, is connected to an input of the shift register 26.

The circuit works as follows: After one of the degenerative conditions of outputs STUV = 1111 or STUV = 0000 has presented itself during four consecutive clock periods, which condition is ascertained because of the fact that the outputs STUV are compared with the input signal A1 by means of the OR-gates 19, 20, 21 and 22, the following takes place: In the case of the code word STUV = 1111 with the input signal A1 = "1" all the input signals of the AND gate 24 are "1" and its output signal is "0". If this condition occurs four clock periods at a stretch, all the inputs of the OR-gate 25 are "0", in consequence of which the inversion of the output signal C2 is effected by means of the OR-gate 18. The same occurs when outputs STUV = 0000 with the input signal A1 = "0". In this case too the output of the AND gate 24 = "0" during four periods at a stretch, similarly affects the shift register 26 to effect the OR-gates 25 and 18.

While there is described above the principles of this invention in connection with specific apparatus, it is to be clearly understood that this description is made only by way of example and not as a limitation to the scope of this invention.

What we claim is:

1. Method for transmitting binary signals by means of digital selfsynchronizing scramblers, comprising: using the information of the storage elements and of the input signal for detecting a degenerative condition of a long series of identical bits in the input signal, which condition is maintained during a fixed number of consecutive clock periods, and then inverting one bit of the input signal in consequence of which the degenerative condition comes to an end when the input signal remains otherwise unchanged.

2. Method according to claim 1, characterized in that the degenerative condition detected at the transmitting end is also detected at the receiving end, when said condition is maintained during the said fixed number of consecutive clock periods, and then inverting one bit of the output signal in consequence of which the original information is restored.

3. Device for ending a predetermined repetition of a degenerative condition in a scrambler at a transmitter, said device comprising: a feedback shift register (1–6) of storage elements (1–4) for producing a maximum length series, an exclusive input OR-gate (13) connected to said feedback shift register, an OR-gate (15) connected to said elements, a second shift register (17) connected to the output of said OR-gate (15) whereby after the fixed number of clock periods a degenerative condition can be detected, a second OR-gate (16) connected to said second shift-register, which second OR-gate (16) is connected on the one side to said exclusive input OR-gate (13), and on the other side to the parallel read input (U) of said second shift register (17), which has such a read condition that only one bit of the input signal can be inverted.

4. Device for ending a predetermined repetition of a degenerative condition in a descrambler at a receiver, said device comprising: a shift register (7-10) of storage elements, an exclusive OR-gate (19-22) connected to each of said storage elements, an input exclusive OR-gate (23) having one fixed input signal ("1"), another input connected to the input of said shift register (7-10), and its output connected to each of said exclusive OR-gates (19-22), an AND-gate (24) connected to the outputs of said exclusive OR-gates (19-22) and having an ignored output, said AND-gate delivering a signal when ascertaining a degenerative condition in an input signal, a second shift register (26) connected to the output of said AND-gate to deliver a signal after a fixed number of clock periods of continuous receipt of said degenerative condition signal, an OR-gate (25) with an ignored output, connected on the one side to an exclusive OR-gate (18) in the output of the former shift register (7-10) and on the other side to the parallel read input (U) of said second shift register (26), which has such a read condition that only one bit of the output signal can be inverted.

5. A device for ending a predetermined repetition number of degenerative condition signals in a first shift register, said degenerative signals comprising a long series of identical bits, and said first shift register comprising a plurality of storage elements and two modulo-2 OR-gates, said device comprising:
    (A) at least one OR-gate connected to said first shift register,
    (B) a second shift register having said predetermined repetition number of stages, and
    (C) an output OR-gate connected to the output of each stage of said second shift register, the output of said output OR-gate being connected directly to an input of said second shift register and being connected to said first shift register, thereby to end said degenerative condition of signal repetition therein.

6. A device according to claim 5 wherein said first shift-register is a scrambling device at a transmitter and said output OR-gate is connected to the input of said scrambling device.

7. A device according to claim 5 wherein said first shift register is a descrambling device at a receiver, and wherein said output OR-gate is connected to the output of said descrambling device.

8. A device according to claim 6 including two exclusive OR-gates connected to the input of said first shift register, and including an OR-gate connected to one of said exclusive OR-gates and to a plurality of said elements of said first shift register.

9. A device according to claim 7 wherein said one OR-gate includes a plurality of exclusive OR-gates connected to the output and each of said storage elements of said first shift register, and an AND-gate connected between said exclusive OR-gates and said second shift register.

10. A device according to claim 7 including an additional storage element connected to the output of said descrambling device.

* * * * *

UNITED STATES PATENT AND TRADEMARK OFFICE
CERTIFICATE OF CORRECTION

PATENT NO. : 4,109,856
DATED : August 29, 1978
INVENTOR(S) : Marius Van Beveren et al It is certified that error appears in the above-identified patent and that said Letters Patent are hereby corrected as shown below:

Column 1, line 17, after "signal" insert a comma. Column 2, line 9, omit "on the other side". Column 4, line 9, after "signal" insert -- V -- ; line 11, change "(1,)" to -- "1", -- ; line 18, change "outputs" to -- output -- ; line 24, after "input" insert -- signal V will only take place for one bit. -- ; line 35, change ". One" to -- , one -- .
Column 5, line 5, change "(FIG. 4): 6" to -- shown in FIG. 4: six -- ; line 7, omit the comma after "output"; line 8, insert a comma after "inputs"; line 12, change "gates" to -- OR-gates 19, 20, 21 and 22 -- ; line 37, insert a comma before "all". Column 6, line 4, after "condition" insert -- of a long series of identical bits -- ; line 20, after "condition" insert -- in a long series of identical bits -- .

Signed and Sealed this

Eighth Day of May 1979

[SEAL]

Attest:

RUTH C. MASON
Attesting Officer

DONALD W. BANNER
Commissioner of Patents and Trademarks